US010252712B2

(12) United States Patent
Ossareh et al.

(10) Patent No.: US 10,252,712 B2
(45) Date of Patent: Apr. 9, 2019

(54) ADAPTING ENGINE-ON TIME TO DRIVER AGGRESSIVENESS IN A HYBRID VEHICLE

(71) Applicant: FORD GLOBAL TECHNOLOGIES, LLC, Dearborn, MI (US)

(72) Inventors: Hamid-Reza Ossareh, South Burlington, VT (US); Mohammad Shakiba-Herfeh, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/290,251

(22) Filed: Oct. 11, 2016

(65) Prior Publication Data

US 2018/0099658 A1    Apr. 12, 2018

(51) Int. Cl.
| | |
|---|---|
| *B60W 20/40* | (2016.01) |
| *B60K 6/24* | (2007.10) |
| *B60W 20/13* | (2016.01) |
| *F02D 41/04* | (2006.01) |
| *F02D 41/06* | (2006.01) |
| *F02D 41/26* | (2006.01) |
| *F02D 11/10* | (2006.01) |
| *F02D 41/14* | (2006.01) |

(52) U.S. Cl.
CPC .............. *B60W 20/40* (2013.01); *B60K 6/24* (2013.01); *B60W 20/13* (2016.01); *F02D 11/105* (2013.01); *F02D 41/042* (2013.01); *F02D 41/045* (2013.01); *F02D 41/06* (2013.01); *F02D 41/062* (2013.01); *F02D 41/26* (2013.01); *B60W 2510/0609* (2013.01); *B60W 2710/06* (2013.01); *B60Y 2300/43* (2013.01); *B60Y 2300/91* (2013.01); *B60Y 2400/112* (2013.01); *F02D 41/1406* (2013.01); *F02D 2200/602* (2013.01); *F02D 2200/606* (2013.01); *Y10S 903/905* (2013.01)

(58) Field of Classification Search
CPC .. B60W 20/13; B60W 20/40; B60W 2710/06; B60W 2510/0609; F02D 41/062; F02D 11/105; F02D 41/26; F02D 41/06; F02D 41/045; F02D 41/042; Y10S 903/905
See application file for complete search history.

(56) References Cited

U.S. PATENT DOCUMENTS

| | | | |
|---|---|---|---|
| 6,999,870 B2 | 2/2006 | Katrak et al. | |
| 2016/0009271 A1 | 1/2016 | Choi et al. | |
| 2016/0114805 A1 | 4/2016 | Yang et al. | |
| 2016/0350934 A1* | 12/2016 | Dey | ........................ H04N 19/44 |

FOREIGN PATENT DOCUMENTS

EP          2557012 A1    2/2013

* cited by examiner

*Primary Examiner* — Mussa A Shaawat
(74) *Attorney, Agent, or Firm* — David B. Kelley; Brooks Kushman P.C.

(57) ABSTRACT

A vehicle includes an engine and at least one controller. In response to a change in a rate of change of a driver control input to the vehicle, the at least one controller is programmed to alter conditions under which the engine will be started and stopped such that engine-on time increases due to the rate increasing and decreases due to the rate decreasing.

6 Claims, 5 Drawing Sheets

ADAPTING ENGINE-ON TIME TO DRIVER AGGRESSIVENESS IN A HYBRID VEHICLE

TECHNICAL FIELD

The present disclosure relates to a control strategy in a hybrid vehicle that adapts engine-on time to driver aggressiveness to improve driveability.

BACKGROUND

Hybrid electric vehicles (HEVs) may include an internal combustion engine and a traction motor to provide power to propel the vehicle. To conserve fuel, the motor can be used to drive the vehicle while the engine is turned off. Upon an increased driver demand, a reduced state of charge in a battery, or other conditions, the engine can be restarted. Excessive engine starting and engine stopping may degrade drivability of the vehicle.

SUMMARY

According to one embodiment, a vehicle includes an engine and at least one controller. In response to a change in a rate of change of a driver control input to the vehicle, the at least one controller is programmed to alter conditions under which the engine will be started and stopped such that engine-on time increases due to the rate increasing and decreases due to the rate decreasing.

According to another embodiment, a method of controlling a powertrain in a hybrid vehicle includes altering a penalizing factor in response to a change in a rate of change of a driver control input to the vehicle. The method also includes incorporating the changed penalizing factor into an energy management logic of the vehicle configured to specify conditions under which the engine will be started and stopped such that a first penalizing factor value for an aggressive driver results in increased engine-on time during a drive cycle relative to engine-on time associated with a second penalizing factor value for a non-aggressive driver during the drive cycle. The method also includes selectively constraining a request to turn the engine off or to issue a command to turn the engine on based on the energy management logic incorporated with the changed penalizing factor.

According to another embodiment, a method includes altering conditions under which the engine will be started and stopped in response to a change in a rate of change of a driver control input to the vehicle such that engine-on time increases due to the rate increasing and decreases due to the rate decreasing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
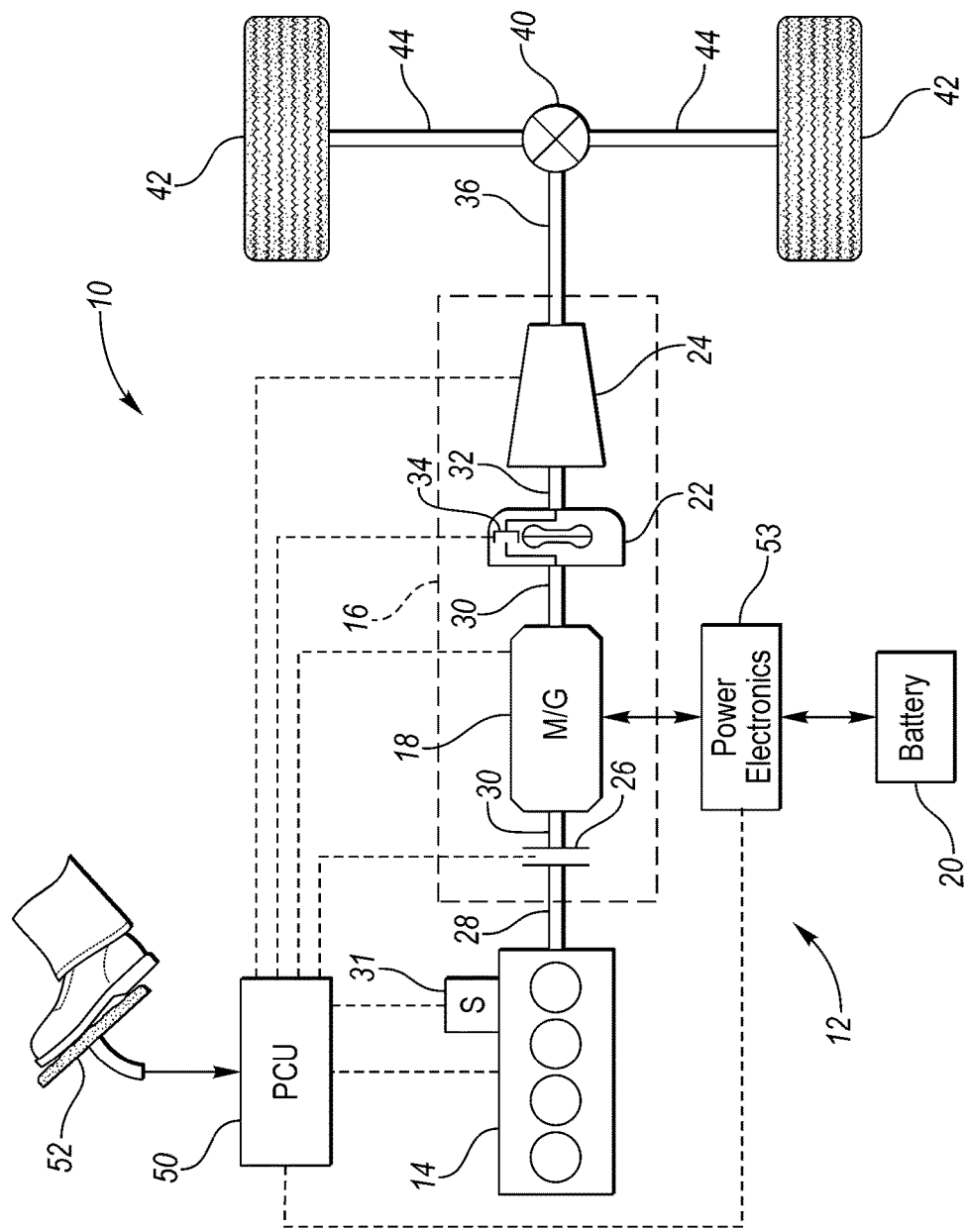
FIG. 1 illustrates a schematic of one example of a hybrid electric vehicle having various powertrain components that are controlled by a control system.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle 10 may vary. The vehicle 10 includes a powertrain 12, which may include an engine 14 that drives an automatic transmission 16. As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 may be connected sequentially in series, as illustrated in FIG. 1.

The engine 14 and the M/G 18 are both drive sources for the vehicle 10. The engine 14 generally represents a power source that may include an internal combustion engine such as a gasoline, diesel, or natural gas-powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the vehicle 10. The M/G 18 is continuously drivably connected to the shaft 30, which extends through the M/G 18, whereas the engine 14 is drivably connected to the shaft 30 only when the disconnect clutch 26 is at least partially engaged.

A separate starter motor 31 can be selectively engaged with the engine 14 to rotate the engine 14 to allow combustion to begin. Once the engine 14 is started, the starter motor 31 can be disengaged from the engine 14 via, for example, a clutch (not shown) between the starter motor 31 and the engine 14. In one embodiment, the engine 14 is started by the starter motor 31 while the disconnect clutch 26 is open, keeping the engine 14 disconnected with the M/G 18. Once the engine 14 has started and is brought up to speed with the M/G 18, the disconnect clutch 26 can couple the engine 14 to the M/G to allow the engine 14 to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G 18.

The M/G 18 is connected to the torque converter 22 via shaft 30. The torque converter 22 is therefore connected to the engine 14 when the disconnect clutch 26 is at least partially engaged. The torque converter 22 may include an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch, and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain 12 to one or more wheels 42. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 50 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 53. In some embodiments, power electronics 53 condition direct current (DC) power provided by the battery 20 to the requirements of the M/G 18. For example, power electronics 53 may provide three phase alternating current (AC) to the M/G 18. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle 10. In general, depressing and releasing the pedal 52 generates an accelerator pedal position signal that may be interpreted by the controller 50 as a demand for increased power or decreased power, respectively. Based at least upon input from the pedal 52, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle 10 with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle 10, this operation mode may be referred to as the "engine mode," "engine-only mode," or "mechanical mode." The M/G 18 may assist the engine 14 by providing additional power to turn the shaft 30. This operation mode may be referred to as a "hybrid mode," an "engine-motor mode," or an "electric-assist mode."

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring to power electronics 53 that may include an inverter, for example. The controller 50 commands the power electronics 53 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

One difference between the series arrangement shown in FIG. 1 and other HEV systems (such as a powersplit) is the increased number of discrete control variables that must be managed in order to optimize fuel and emissions together. The energy management strategy for the arrangement of FIG. 1 requires commanding the state of the torque converter 22, the gear number and the state of the disconnect clutch 26, as well as the required torque from the M/G 18 and the engine 14. Once these variables are defined, the battery power and the engine operating point are consequently determined. There is power loss in the discrete changes of the control inputs; for example, gear shifts require slipping clutches in the transmission 16 which dissipates energy to heat through the shift. Ignoring such losses produces inaccurate estimation of fuel consumption by the energy management control system which produces non-optimal controls.

On the other hand, the theoretical approaches such as methods based on Pontryagin's minimum principle (PMP) do not consider drivability issues, such as number of engine starts ("pull-ups") based on driver aggressiveness, for example. The present disclosure provides a method to adapt engine-ON time (and/or number of EPUDs) to driver aggressiveness. Engine pull-ups are implemented into the optimization method through Pontryagin's minimum principle. Penalty terms (or "penalizing factors") can be introduced in Hamiltonian cost functions and can be selected to improve drivability based on driver aggressiveness. The disclosed control strategy improves the vehicle drivability by penalizing engine pull-ups and pull-downs to avoid excessive EPUD (engine pull-up and pull-downs; engine starts and stops).

According to various embodiments described herein, the number of EPUDs are limited based on driver aggressiveness in order to improve drivability. In this disclosure, driver aggressiveness is taken into consideration during the determination as to whether the engine 14 should be started or stopped. In other words, the control strategy (i.e., energy management logic) estimates the amount of fuel that would be required or lost to achieve an engine start or engine stop before such action is taken. Penalty parameters (or "penalizing factors") are defined in the PMP control strategy to decrease the number of engine pull-ups and engine pull-downs (i.e., increase engine-ON time) based on driver aggressiveness in order to achieve better drivability.

Optimization of fuel within the control system of the hybrid vehicle 10 can be stated as the minimization of the following cost function during driving cycles from time time $t_0$ to $t_f$, in which the fuel consumption of the engine 14 for the entire cycle is being minimized:

$$\min \int_{t_0}^{t_f} \dot{m}_f(T_e, \omega_e, P_{bat}) dt$$

where $\dot{m}_f$ is the fuel rate of the engine 14 which depends on engine torque, $T_e$, the engine speed, $\omega_e$, and battery power, $P_{bat}$. The cost function is also subject to state of charge (SOC) limits in the battery 20.

The above cost function can be solved for quasi-static vehicle models with dynamics of the battery 20 given as follows:

$$\dot{SOC}(P_{bat}) = -\frac{1}{Q_{bat}} i_{bat}(P_{bat}) = -\frac{1}{Q_{bat}} \cdot \frac{V_{OC} - \sqrt{V_{OC}^2 - 4RP_{bat}}}{2R}$$

where $i_{bat}$ is the battery current, $Q_{bat}$ is the battery's capacity, $P_{bat}$ the battery power, $V_{OC}$ is the battery's open circuit voltage, and R is the battery internal resistance.

The Hamiltonian for the functions above with the SOC dynamics constraint can be written as:

$$\min H(t) = \dot{m}_f(T_e, \omega_e, P_{bat}) + \chi * \dot{SOC}(P_{bat}(t))$$

where $\chi$ is a coefficient representing the co-state variable to be determined by the optimization method, and it characterizes the weighting between the electrical and chemical power consumption. The value of the coefficient depends on the driving cycle to keep the battery state of charge balanced.

The optimization strategy described above, if implemented without constraint, can result in a high number of engine pull-ups, which raises drivability concerns. In some HEVs, the electric motor provides the needed torque to pull up the engine when needed. As a result of engine dynamics, the responsiveness of the powertrain can decrease during the engine pull up. Therefore, it may be desirable to consider the degree of driver aggressiveness in the performance-fuel economy trade-off in the energy management strategy. Specifically, for an aggressive driving style, engine pull-downs may be reduced, and the amount of engine-on time may be increased so that the engine is available more often resulting in improved powertrain responsiveness. Engine pull-ups require extra power that is provided directly from the engine or from the battery using energy that needs to be replaced by the engine.

According to various embodiments herein, the Hamiltonian function can be modified to incorporate the fuel-equivalent loss of engine pull-up events as suggested in the following equation:

$$H(t) = \dot{m}(T_e, \omega_e, P_{bat}) + \chi * \dot{SOC}(P_{bat}(t)) + + K_{EngOFF}\{P_{eng}(t) = 0\}$$

The coefficient $K_{EngOFF}$ is a design parameter that characterizes the importance of the drivability considerations. While the coefficient $\chi$ is used to focus on the balance of electrical and chemical energy usage and may be iteratively or adaptively tuned to make the battery state of charge balanced, $K_{EngOFF}$ is the penalizing factor used to penalize the engine 14 being OFF and may be selected such that the engine ON and OFF timing is acceptable for a given drive cycle. Decreasing $K_{EngOFF}$ will decrease engine-on time allowing the engine 14 to work in more efficient areas. A constant $K_{EngOFF}$ would treat all driving cycles with different levels of aggressiveness equally, which would result in a non-ideal trade-off between number of engine pull ups and fuel economy. To account for driver aggressiveness in real time, $K_{EngOFF}$ may be a function of a driver aggressiveness metric, A, shown in the following equation:

$$K_{EngOFF} = f(A)$$

Figure 2:
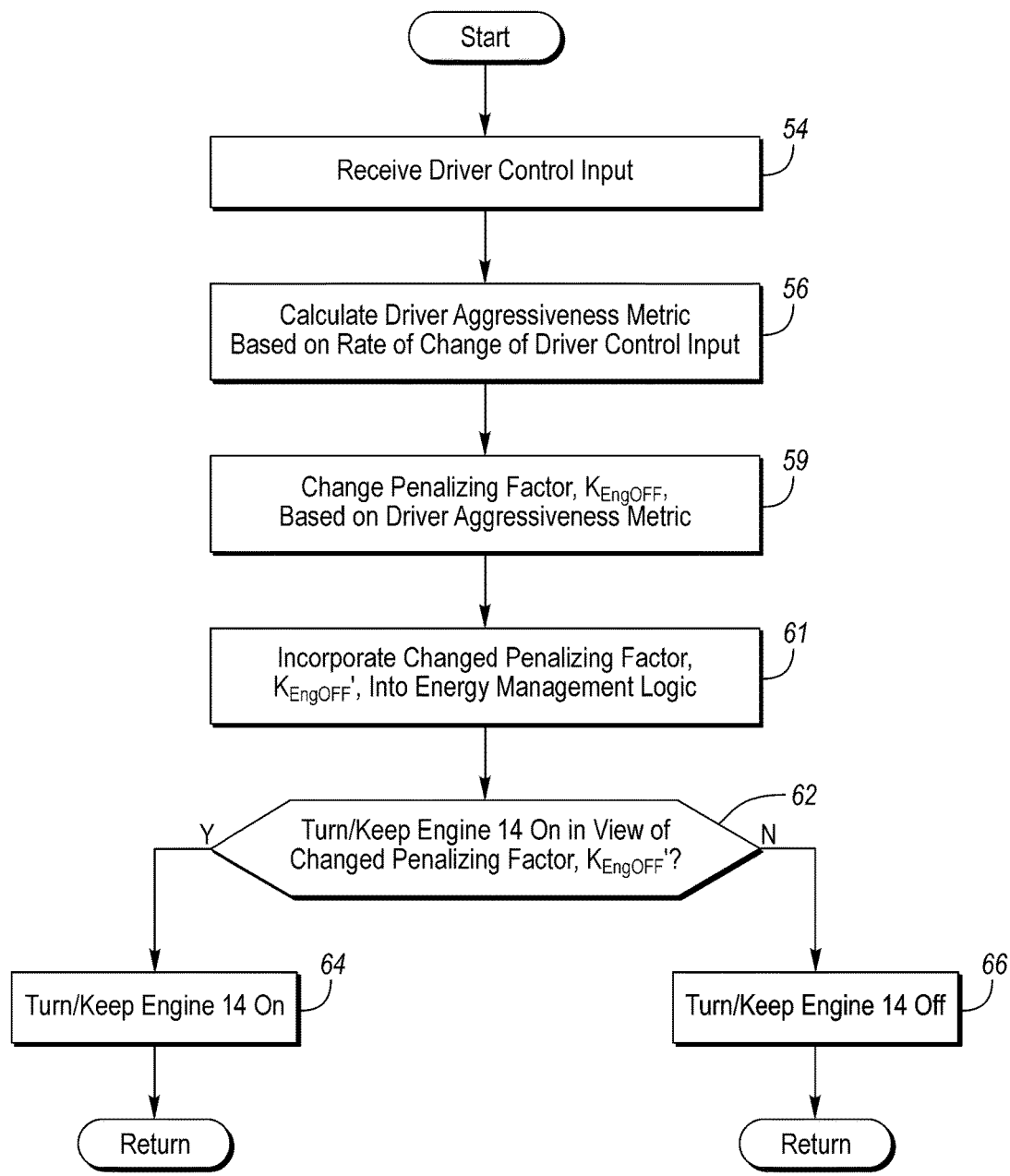
FIG. 2 illustrates a flowchart representing one embodiment of an algorithm implemented by the control system to control engine starts and stops based on driver aggressiveness.

FIG. 2 illustrates a flowchart representing one embodiment of an algorithm implemented by the control system to control engine starts and stops based on driver aggressiveness. The method may begin with the step 54 of receiving a driver control input. In an embodiment, the controller 50 (FIG. 1) may receive the driver control input, which may be indicative of driver aggressiveness. For example and without limitation, the driver control input may be associated with a value of or a rate of change of accelerator pedal position, brake pedal position, inter-vehicle distance, steering wheel position, vehicle speed, and/or vehicle acceleration.

The method may continue with the step 56 of calculating the driver aggressiveness metric based on the driver control input. In an embodiment, the driver aggressiveness metric is based on data indicative of the driver control input within a temporal sliding window. The temporal sliding window is a certain time period that shifts or slides over time in which data is considered (i.e., old data is purged as new data falls within the window). For example and without limitation, the temporal sliding window may be the last thirty minutes, in which case, the rate of change of the driver control input would be based on data indicative of the driver control input within the last thirty minutes (i.e., data outside of the last thirty minutes would be purged from the calculation). Moreover, the temporal sliding window may have different lengths. The temporal sliding window may be static or adjusted dynamically. The dynamic adjustment of the sliding window may be determined by different operating modes of the vehicle. For instance a hybrid electric vehicle may have different temporal sliding windows depending on an electric-only or hybrid mode. Furthermore, the driver control input may be in the form of a signal that can be filtered or processed.

Figure 3A:
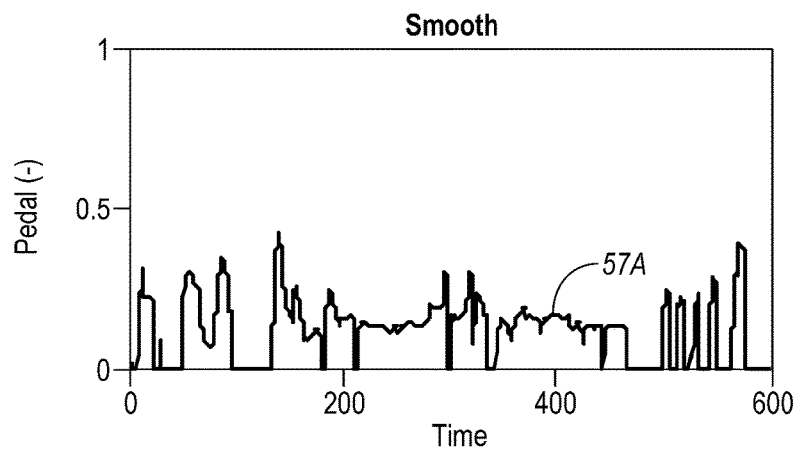
FIGS. 3A-3C are plots illustrating accelerator pedal position signals over a given drive cycle associated with drivers having differing degrees of aggressiveness.
Figure 3B:
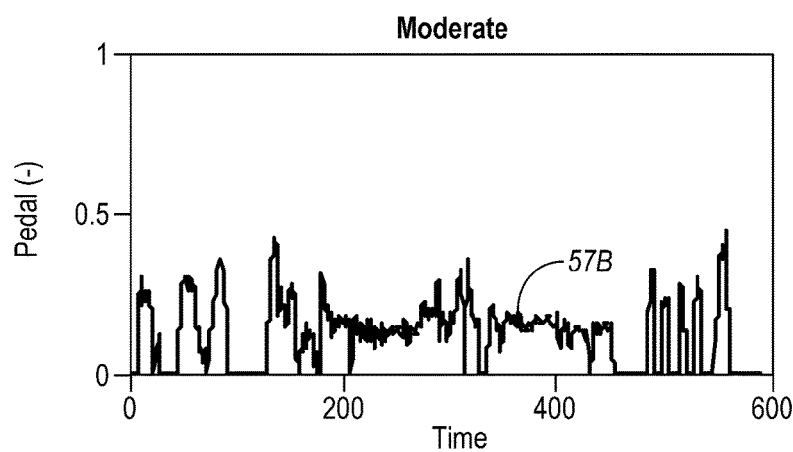
Figure 3C:
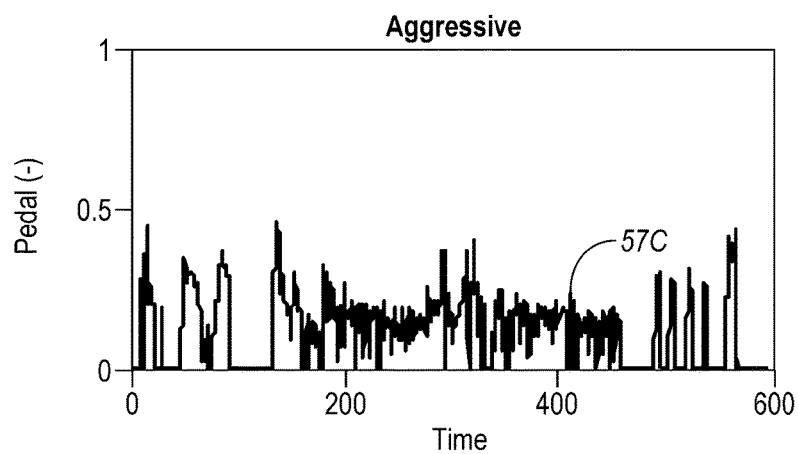

FIGS. 3A-3C are plots illustrating accelerator pedal position signals, $57_a$, $57_b$, $57_c$, over a given drive cycle associated with drivers having differing degrees of aggressiveness. As illustrated, the rate of change of accelerator pedal position varies for each type of driver; the rate of change for the aggressive driver (associated with signal $57_c$ of FIG. 3C) over the drive cycle is generally greater than the rate of change for the smooth or non-aggressive driver (associated with signal $57_a$ of FIG. 3a) over the same drive cycle.

In some embodiments, the driver control input (e.g., the accelerator pedal signal) can be processed to estimate the driver aggressiveness metric, the metric being associated with the rate of change. One of ordinary skill in the art will understand that this estimation can be done in a number of ways. In one embodiment, the driver control input is a signal that is bandpass filtered, as shown in the equation below, such that portions of the signal associated with low and high frequencies are omitted from the driver aggressiveness metric calculation:

$$P_{bp} = G(q)P$$

where G(q) is a linear bandpass filter and q is the difference operator. The output may then be squared and fed to a lossy integrator to compute the driver aggressiveness metric, A, as follows:

$$A(k) = \max(0, A(k) + P_{bp}^2 - \epsilon)$$

where k is the sample number and E is a small number governing the "forgetting effect." According to the above equation, the driver aggressiveness metric, A, can have a minimum value of zero. When the driver becomes aggressive (i.e., the rate of change of the driver control input increases), the driver aggressiveness metric increases. Moreover, in some embodiments, the controller 50 (FIG. 1) may apply varying weights to the data indicative of the driver control input (on which the driver aggressiveness metric is based) such that the weights decrease as ages of the corresponding data increase (i.e., more weight afforded to newer data, and less weight afforded to older data).

Figure 4:
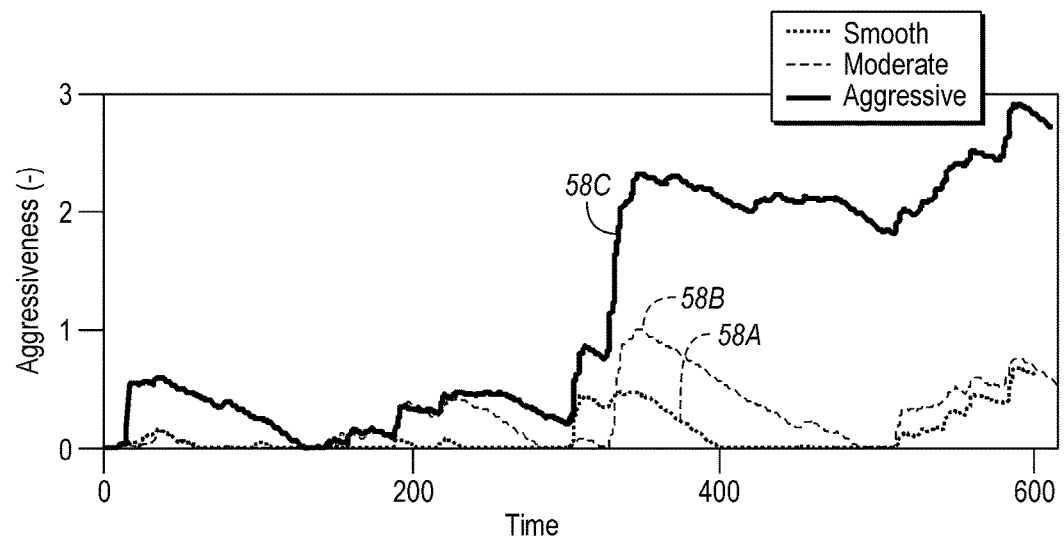
FIG. 4 is a plot illustrating a driver aggressiveness metric, A, over the given drive cycle based on the accelerator pedal position signals of FIGS. 3A-3C associated with drivers having differing degrees of aggressiveness.

FIG. 4 is a plot illustrating driver aggressiveness metric, A, over the given drive cycle based on the accelerator pedal position signals, $57_a$, $57_b$, $57_c$, of FIGS. 3A-3C associated with drivers having differing degrees of aggressiveness. Curve $58_a$ represents the calculated driver aggressiveness metric over the drive cycle for the smooth or non-aggressive driver; curve $58_b$ represents the calculated driver aggressiveness metric over the drive cycle for the moderate driver; and curve $58_c$ represents the calculated driver aggressiveness metric over the drive cycle for the aggressive driver. As illustrated, the driver aggressiveness metric for the aggressive driver is generally greater than the driver aggressiveness metric for the smooth (non-aggressive) driver throughout the drive cycle.

Referring back to FIG. 2, the method may continue with the step 59 of changing the penalizing factor, $K_{EngOFF}$, of the energy management logic. As described above, $K_{EngOFF}$ is the penalizing factor used to penalize the engine 14 being OFF and may be selected such that the engine ON and OFF timing is acceptable for a given drive cycle based on driver aggressiveness. Furthermore, the energy management logic may be configured to specify conditions under which the engine will be started and stopped.

Figure 5:
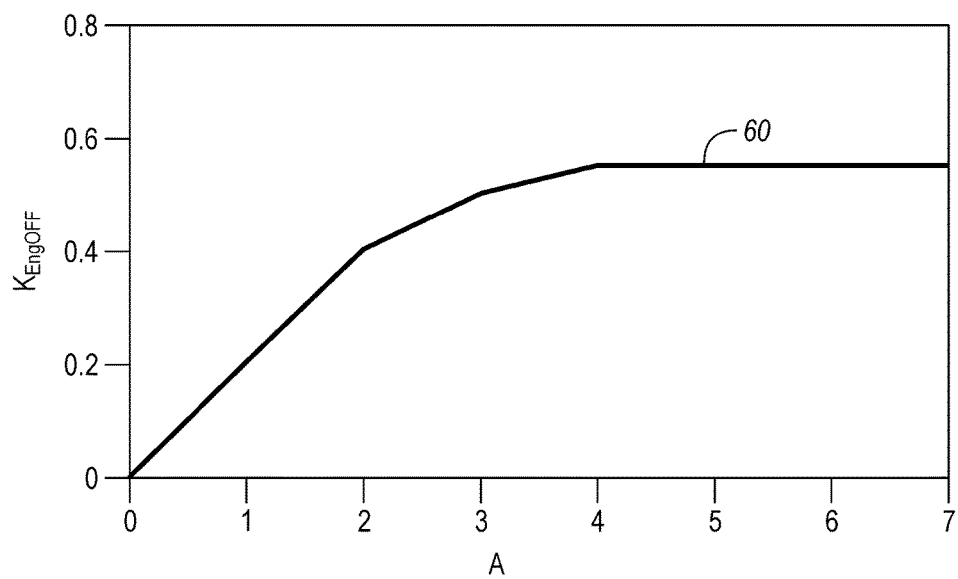
FIG. 5 is a plot correlating the driver aggressiveness metric, A, to a penalizing factor, $K_{EngOFF}$, to be incorporated into an energy management logic of the vehicle.

FIG. 5 is a plot correlating the driver aggressiveness metric to a penalizing factor, $K_{EngOFF}$, to be incorporated into an energy management logic of the vehicle 10. As illustrated in the figure, the penalizing factor, $K_{EngOFF}$, increases as the driver aggressiveness metric increases (and decreases as the metric decreases). Although the illustrated embodiment discloses a generally linear $K_{EngOFF}$-A curve 60, one of ordinary skill in the art will understand that the $K_{EngOFF}$-A curve may exhibit various slopes and curvatures.

Referring back to FIG. 2, the method may continue with the step 61 of incorporating the changed penalizing factor, $K_{EngOFF}'$, into the energy management logic of the vehicle 10. Thereafter, the method may continue with the step 62 of determining whether to turn/keep the engine 14 ON in view of the changed penalizing factor, $K_{EngOFF}'$. In situations where the changed penalizing factor, $K_{EngOFF}'$, is great enough to reverse an original determination to turn or keep the engine 14 OFF, the method may continue with the step 64 of keeping the engine 14 ON (or turning the engine 14 ON if the engine 14 was previously OFF). Conversely, in situations where the changed penalizing factor, $K_{EngOFF}'$, is not great enough to reverse the original determination, then the method may continue with the step 66 of turning the engine 14 OFF (or keeping the engine 14 OFF if the engine 14 was already OFF). One of ordinary skill in the art will understand that there may be various ways to program the controller 50 such that the controller 50 constrains a request to turn the engine 14 OFF or issues a command to turn the engine 14 ON in light of the changed penalizing factor, $K_{EngOFF}'$, which is based on driver aggressiveness. For example and without limitation, in some embodiments, the controller 50 compares the new command (which may be some output based on the energy management logic incorporated with the changed penalizing factor, $K_{EngOFF}'$) or the changed penalizing factor, $K_{EngOFF}'$, itself to a threshold(s).

Figure 6A:
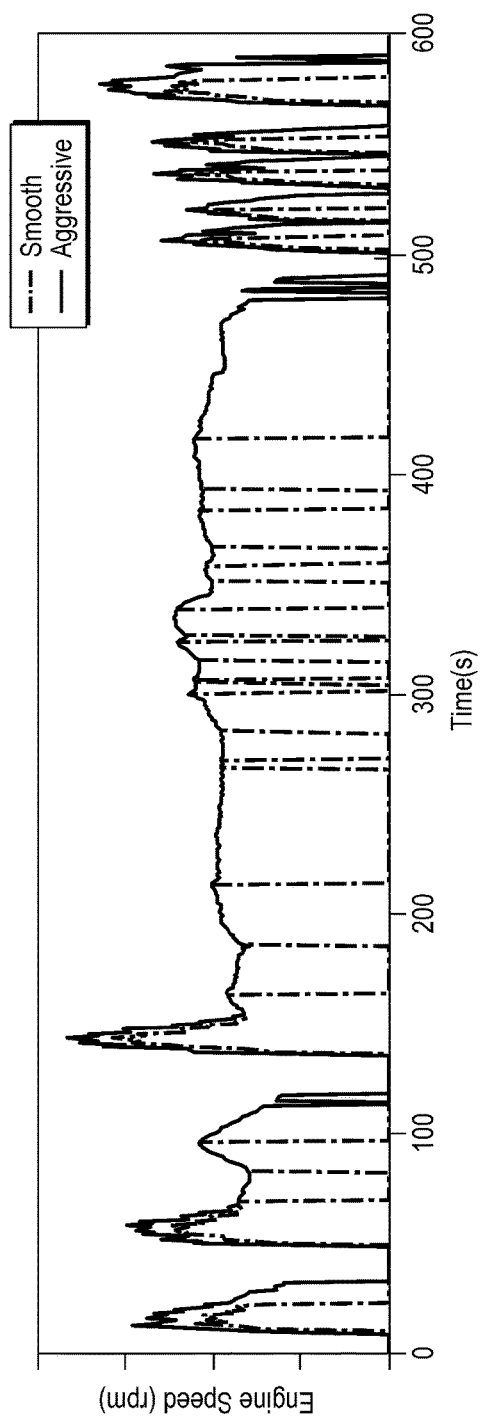
FIGS. 6A-6B are plots illustrating engine speed and engine torque, respectively, over the given drive cycle of a vehicle programmed with the algorithm of FIG. 2 for drivers having differing degrees of aggressiveness.
Figure 6B:
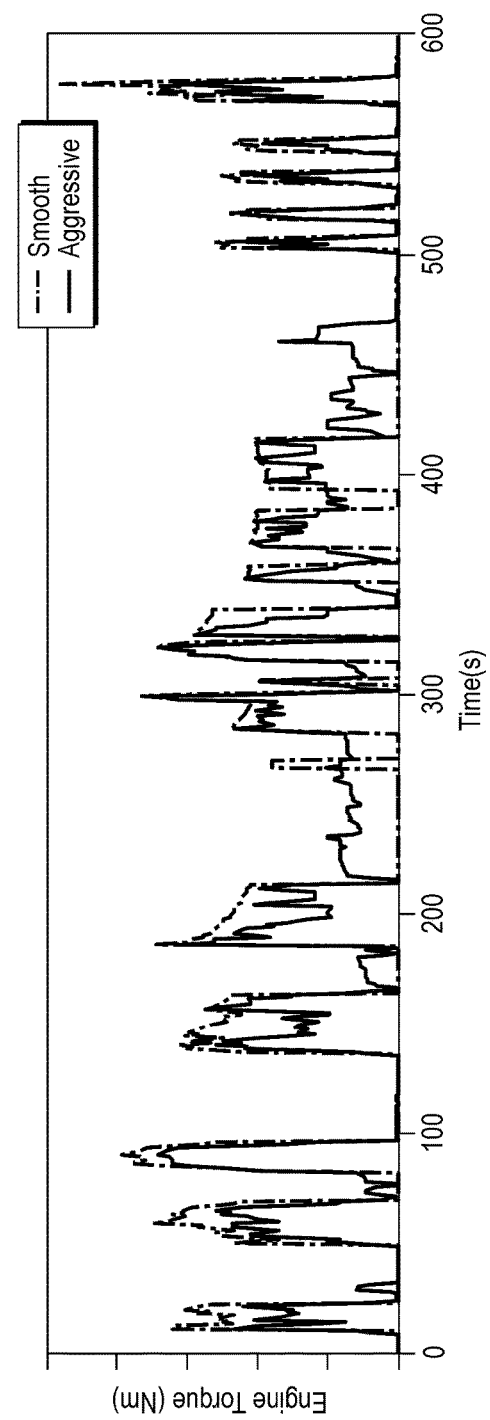

FIGS. 6A-6B are plots illustrating engine speed and engine torque, respectively, over the given drive cycle of a vehicle programmed with the algorithm of FIG. 2 for drivers having differing degrees of aggressiveness. As illustrated in FIG. 6B, the engine 14 stays ON for longer periods of time for the aggressive driver. Moreover, as illustrated in FIG. 6C, greater engine torque is available to the aggressive driver most of the time (relative to engine torque available to the non-aggressive driver). As such, engine-ON time increases due to the driver aggressiveness metric increasing and decreases due to the driver aggressiveness metric decreasing, where the driver aggressiveness metric is based on the rate of change of the driver control input, which may be accelerator pedal position.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:
1. A vehicle comprising:
   an engine; and a controller programmed to, responsive to a rate of change of driver control input to the vehicle during a predefined duration that is different depending on operating mode of the vehicle, alter conditions under which the engine will be started and stopped such that engine-on time increases due to the rate increasing and decreases due to the rate decreasing.

2. The vehicle of claim 1, wherein the driver control input is associated with a position of an accelerator pedal of the vehicle.

3. The vehicle of claim 1, wherein the driver control input is a signal that is bandpass filtered such that portions of the signal associated with low and high frequencies are omitted from the rate of change.

4. A method of controlling a powertrain in a vehicle, comprising:
   altering conditions under which an engine of the vehicle will be started and stopped responsive to a rate of change of driver control input to the vehicle during a predefined duration that is different depending on whether the vehicle is in electric vehicle mode or hybrid mode such that engine-on time increases due to the rate increasing and decreases due to the rate decreasing.

5. The method of claim 4, wherein the driver control input is associated with a position of an accelerator pedal of the vehicle.

6. The method of claim 4, wherein the driver control input is a signal that is bandpass filtered such that portions of the signal associated with low and high frequencies are omitted from the rate of change.

* * * * *